United States Patent
Brunken, Jr.

(10) Patent No.: US 9,162,748 B2
(45) Date of Patent: Oct. 20, 2015

(54) AFT-LOADING AIRCRAFT WITH TWIN T-TAIL ASSEMBLY

(75) Inventor: John Brunken, Jr., Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 215 days.

(21) Appl. No.: 13/699,998

(22) PCT Filed: Jul. 22, 2011

(86) PCT No.: PCT/US2011/044937
§ 371 (c)(1),
(2), (4) Date: Nov. 26, 2012

(87) PCT Pub. No.: WO2013/015765
PCT Pub. Date: Jan. 31, 2013

(65) Prior Publication Data
US 2013/0153708 A1    Jun. 20, 2013

(51) Int. Cl.
| B64C 5/02 | (2006.01) |
| B64C 1/26 | (2006.01) |
| B64C 27/28 | (2006.01) |
| B64D 27/02 | (2006.01) |
| B64C 1/14 | (2006.01) |
| B64C 29/00 | (2006.01) |

(52) U.S. Cl.
CPC .................. B64C 5/02 (2013.01); B64C 1/1415 (2013.01); B64C 1/26 (2013.01); B64C 27/28 (2013.01); B64C 29/0033 (2013.01); B64D 27/02 (2013.01)

(58) Field of Classification Search
CPC .......... B64C 39/066; B64C 5/02; B64C 5/06; B64C 27/28; B64C 1/26; B64C 29/0033; B64C 29/0075; B64D 27/20; B64D 27/02; B64D 9/00

USPC .................. 244/87, 91, 66, 56, 7 C
See application file for complete search history.

(56) References Cited

U.S. PATENT DOCUMENTS

| D189,327 S | * | 11/1960 | Thieblot | D12/337 |
| 2,989,269 A | * | 6/1961 | Le Bel | 244/12.3 |
| 3,409,248 A | * | 11/1968 | Bryan | 244/6 |

(Continued)

FOREIGN PATENT DOCUMENTS

DE    102004035161 A1    2/2006

OTHER PUBLICATIONS

DE 10200435161—specification (english machine translation).*

(Continued)

*Primary Examiner* — Tien Dinh
*Assistant Examiner* — Alexander V Giczy
(74) *Attorney, Agent, or Firm* — James E. Walton

(57) ABSTRACT

An aircraft includes a fuselage, wings attached to the fuselage, a door in an aft portion of the fuselage for providing access to an interior portion of the fuselage, a first and second vertical stabilizer attached to the aft portion of the fuselage, and a horizontal stabilizer transversely attached to the first and second vertical stabilizers. The fuselage further comprises a first side member adjacent to a first side of the door and a second side member adjacent to a second side of the door, and the first side member extends into the first vertical stabilizer and the second side member extends into the second vertical stabilizer; additionally both the first and second side members further extend substantially the vertical depth of the fuselage along the aft door.

8 Claims, 5 Drawing Sheets

(56) References Cited

U.S. PATENT DOCUMENTS

| | | | |
|---|---|---|---|
| 3,652,035 A | | 3/1972 | Fredericks |
| 3,666,211 A | | 5/1972 | Cathers et al. |
| 4,448,372 A | * | 5/1984 | Larson .................. 244/87 |
| 6,014,940 A | * | 1/2000 | Jacobson .............. 114/271 |
| 6,273,363 B1 | * | 8/2001 | Sprenger .............. 244/13 |
| 7,562,845 B2 | * | 7/2009 | Schoene ............... 244/119 |
| 2002/0153452 A1 | | 10/2002 | King et al. |
| 2004/0245374 A1 | | 12/2004 | Morgan |
| 2008/0099599 A1 | * | 5/2008 | Hutterer .............. 244/15 |
| 2009/0065632 A1 | * | 3/2009 | Cazals ................. 244/15 |
| 2009/0084889 A1 | | 4/2009 | Cazals |
| 2010/0133377 A1 | | 6/2010 | Cazals |
| 2010/0148000 A1 | * | 6/2010 | Llamas Sandin et al. ...... 244/87 |
| 2010/0171001 A1 | * | 7/2010 | Karem .................. 244/7 R |

OTHER PUBLICATIONS

EP Office Action dated Apr. 15, 2014 from counterpart EP App. No. 11869946.1.

EESR dated Jun. 24, 2014 from counterpart EP App. No. 11869946.1.

International Search Report and the Written Opinion of the International Searching Authority mailed by ISA/USA, U.S. Patent and Trademark Office on Dec. 16, 2011 for International Patent Application No. PCT/US2011/044937, 10 pages.

* cited by examiner

AFT-LOADING AIRCRAFT WITH TWIN T-TAIL ASSEMBLY

TECHNICAL FIELD

This disclosure relates in general to the field of heavier-than-air aircraft, and more particularly to an aft-loading aircraft with a twin t-tail assembly.

DESCRIPTION OF THE PRIOR ART

Aircraft designed for transporting cargo have a number features that distinguish them from passenger aircraft. In particular, many cargo aircraft include a high-mounted tail to allow cargo to be loaded and unloaded on an aft ramp through the rear of the aircraft. These aft-loading cargo ramps are often large enough to allow heavy equipment to be driven in and out the aircraft.

H-tail and T-tail configurations have both been used for the tail assembly of aft-loading aircraft. For example, the Bell-Boeing V-22 Osprey has used an H-tail, while the Boeing C-17 has used a T-tail assembly.

An H-tail with a ramp afterbody is a structurally efficient assembly, but the vertical fins of the H-tail may be subjected to impingement from n/rev rotor wake and vortices shed from a wing-nacelle interface. This can excite horizontal tail vertical bending and can be a significant source of fuselage vibration.

A T-tail ramp afterbody may also have significant shortcomings. For example, a T-tail assembly has a single point load path for stabilizer-to-fin moments with substantial shear loading. Moreover, a T-tail ramp assembly may require a beam across the ramp to carry fin loads, which can significantly increase weight and complexity.

Thus, the design of a lightweight, structurally efficient tail assembly for aft-loading aircraft continues to present significant challenges to engineers and manufacturers.

BRIEF DESCRIPTION OF THE DRAWINGS

The features believed characteristic and novel of the aircraft assembly described herein are set forth in the appended claims. However, the aircraft assembly, as well as a preferred mode of use, and further objectives and advantages thereof, will best be understood by reference to the following detailed description when read in conjunction with the accompanying drawings, wherein:

While the system is susceptible to various modifications and alternative forms, novel features thereof are shown and described below through specific example embodiments. It should be understood, however, that the description herein of specific example embodiments is not intended to limit the system or apparatus to the particular forms disclosed, but on the contrary, the intention is to cover all modifications, equivalents, and alternatives falling within the spirit and scope of the appended claims.

DESCRIPTION OF THE PREFERRED EMBODIMENT

Illustrative embodiments of the novel system are described below. In the interest of clarity, not all features of such embodiments may be described. It should be appreciated that in the development of any such system, numerous implementation-specific decisions can be made to achieve specific goals, such as compliance with system-related and business-related constraints, which will vary from one implementation to another. Moreover, it should be appreciated that such decisions might be complex and time-consuming, but would nevertheless be a routine undertaking for those of ordinary skill in the art having the benefit of this disclosure.

Reference may be made to the spatial relationships between various components and to the spatial orientation of various aspects of components as the system is depicted in the attached drawings. In general, such references assume a frame of reference consistent with observing an aircraft at rest on flat, level ground, in steady level flight, or hover, as the context may dictate. However, as should be recognized by those skilled in the art, the elements, members, components, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the example embodiments described herein may be oriented in any desired direction.

Figure 1A:
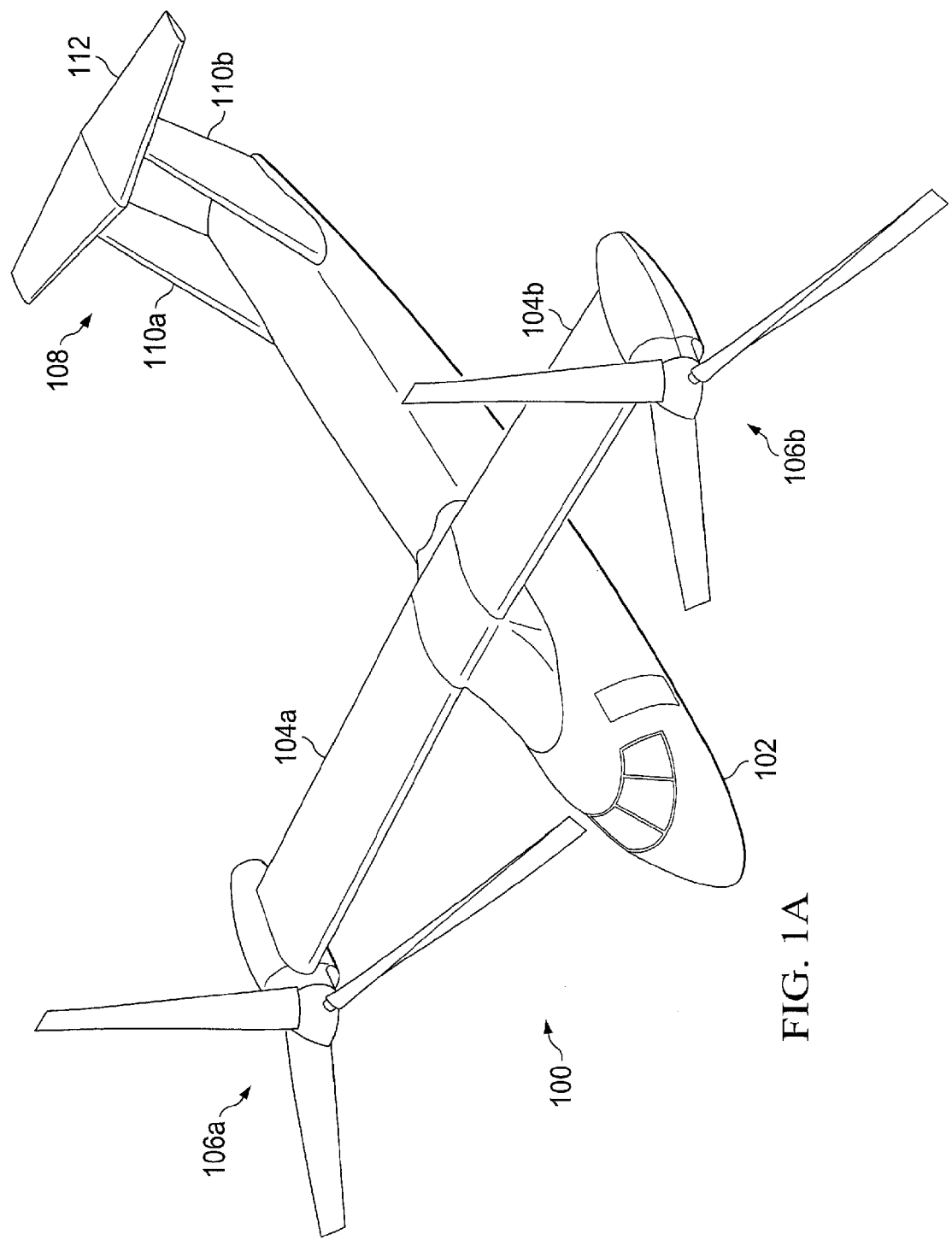
FIG. 1A is a perspective view of an aircraft having an aft-loading twin T-tail assembly according to this specification.

Referring to FIG. 1A in the appended drawings, an aircraft 100 having an aft-loading twin T-tail assembly according to this specification is illustrated. Aircraft 100 includes fuselage 102, wings 104a-104b, propulsion system 106a-106b, and empennage (or "tail assembly") 108. Tail assembly 108 generally includes twin vertical stabilizers (or "fins") 110a-110b, a horizontal stabilizer 112, and a portion of fuselage 102 to which vertical stabilizers 110a-110b can be attached. Each of vertical stabilizers 110a-110b may further include a fixed portion and a movable control surface (i.e., a rudder) along each respective trailing end to control yaw. Horizontal stabilizer 112 may be transversely mounted to the top of each vertical stabilizer 110a-110b, and may be used to balance and share lifting loads with wings 104a-104b. Horizontal stabilizer 112 may also include a fixed lifting portion and a movable control surface (i.e., an elevator) to control pitch.

Figure 1B:
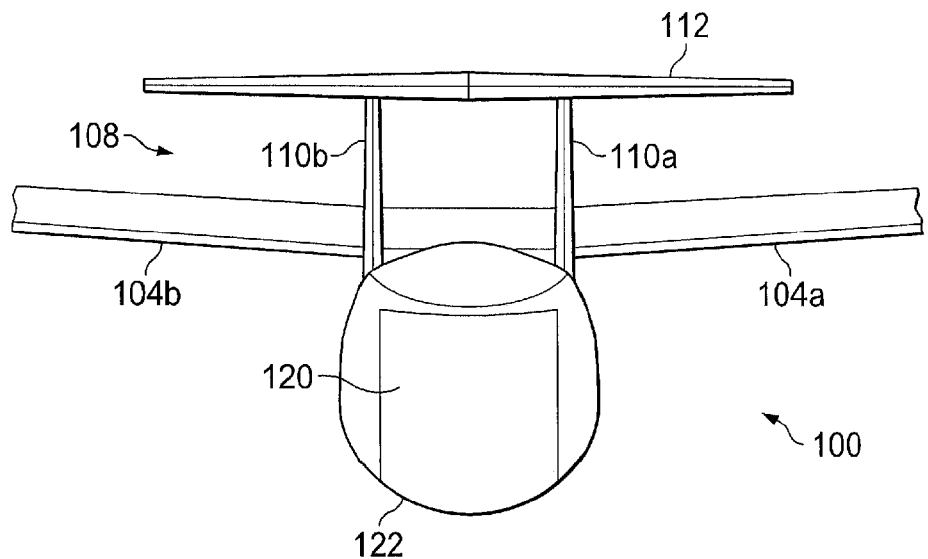
FIG. 1B is a partial rear view of an example embodiment of the aircraft having an aft-loading twin T-tail assembly.

FIG. 1B is a partial rear view of aircraft 100, which further illustrates details that may be associated with one embodiment of tail assembly 108, as well as aft opening 120 and cargo door 122. Cargo door 122 may be movably attached to tail assembly 108 such that cargo door may be moved between a closed position and an open position to provide access through aft opening 120 into an interior cargo compartment, for example. Vertical stabilizers 110a-110b are generally vertical and extend upward and rearward from an internal side member (not visible in FIG. 1B) on each side of aft opening 120 (i.e., on the port and starboard sides).

Figure 2:
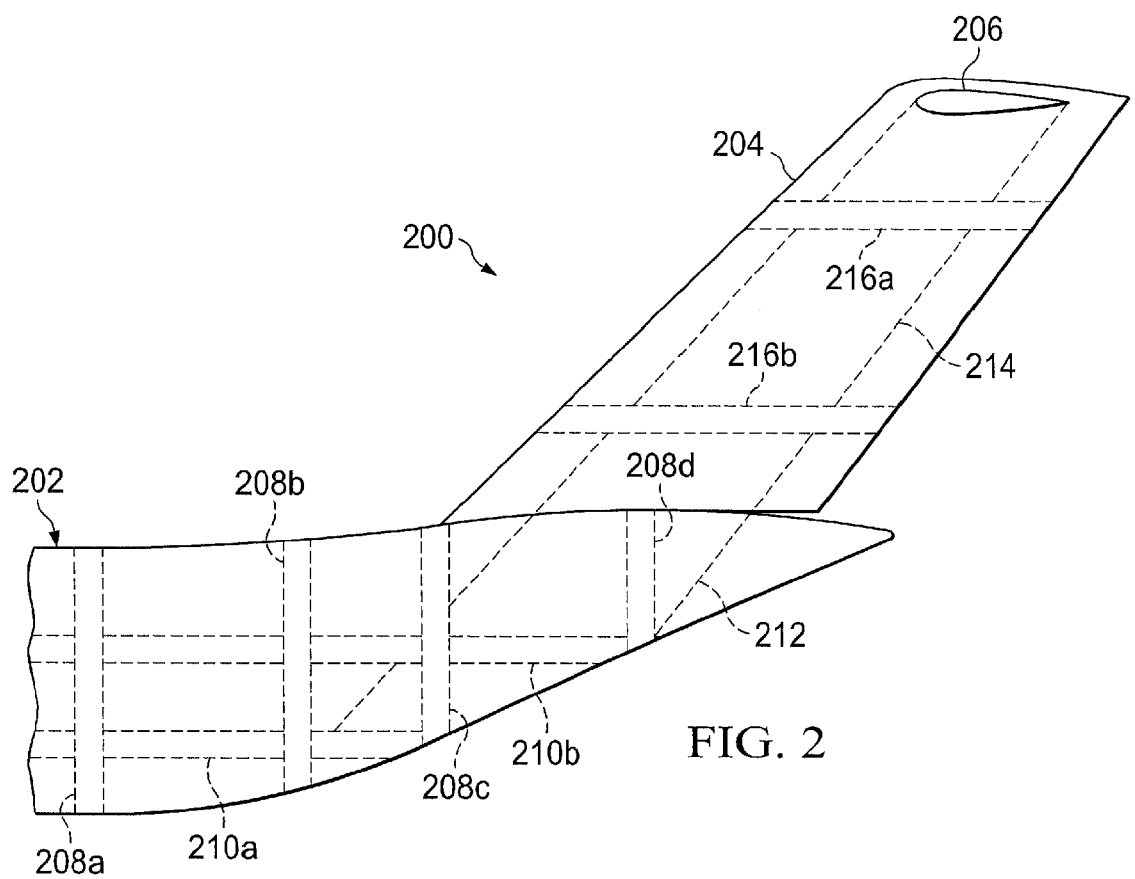
FIG. 2 is a partial side view of an aft-loading twin T-tail assembly according to this specification.

FIG. 2 is a partial side view of an example embodiment of an aft-loading tail assembly 200 in accordance with this specification. Tail assembly 200 includes a generally cylindrical fuselage portion 202 with a tapered tail, a first vertical stabilizer 204, and a horizontal stabilizer 206 transversely attached to first vertical stabilizer 204 and a second vertical stabilizer (not visible in FIG. 2). In the example embodiment of FIG. 2, tail assembly 200 uses a semi-monocoque structure. Such a structure generally has interior frame members (shown in phantom) that can support a load-bearing exterior material or "skin" (e.g., sheet metal or composite material). Interior frame members may include, for example, formers 208a-208d (also known as "frames") in the shape of the desired cross-section, and longitudinal stringer members 210a-210b (also known as longerons) that join formers 208a-208d together. A side member 212 may be rigidly attached to fuselage portion 202. For example, side member 212 may be fastened to one or more of stringer members 210a-210b and/or one or more of formers 208a-208d, particularly in the aft portion of fuselage portion 202, such as frame member 208c-208d. Side member 212 can be advantageously extended into vertical stabilizer 204 to transmit aerodynamic loads from vertical stabilizer 204 into fuselage portion 202. In more particular embodiments, for example, side member 212 can be extended generally up and toward the aft of fuselage portion 202. Thus, the portion of side member 212 that extends into vertical stabilizer 204 (i.e., spar member 214) can be attached to rib members 216a-216b to support a skin on vertical stabilizer 204. Tail assembly 200 also includes a second vertical stabilizer (not visible in FIG. 2) with a substantially similar configuration as first vertical stabilizer 204.

Figure 3:
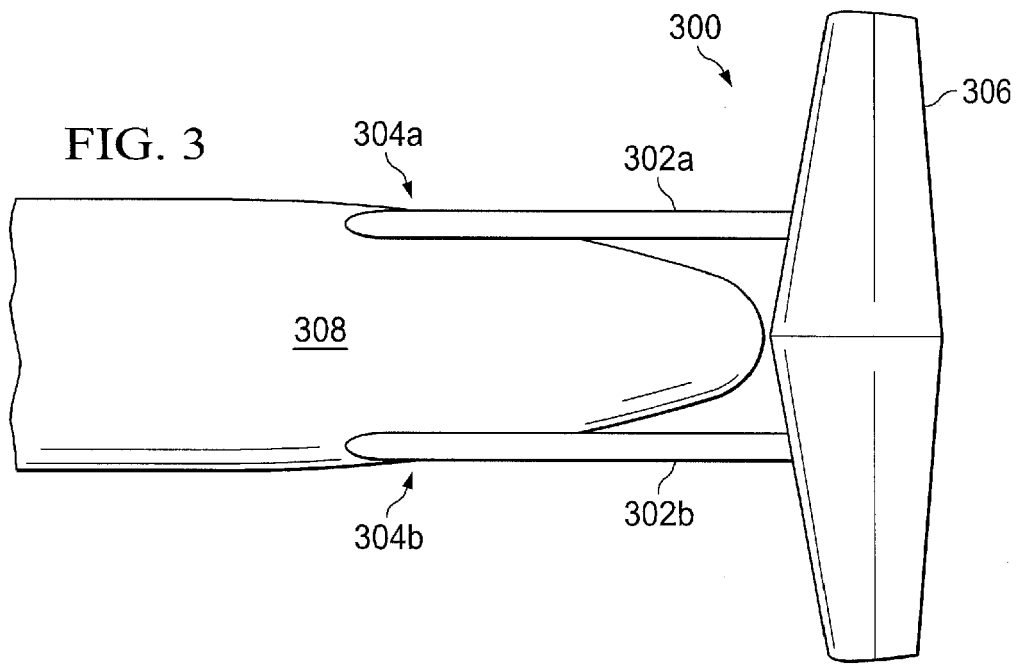
FIG. 3 is a partial top view of the aft-loading twin T-tail assembly.

FIG. 3 is a partial top view of an example tail assembly 300 that illustrates additional details that may be associated with one embodiment of aircraft 100. Vertical stabilizers 302a-302b are generally aligned with a primary side member 304a-304b, respectively. As seen in the various views of FIG. 1A, FIG. 1B, and FIG. 3, the configuration of twin vertical stabilizers and a high-mounted horizontal stabilizer may form a "tail box" between the fuselage, twin vertical stabilizers, and horizontal stabilizer. According to the laws governing fluid dynamics, a fluid's velocity must increase as it passes through a constriction to satisfy the principle of continuity, while its pressure must decrease to satisfy the principle of conservation of mechanical energy. Thus, if air flows through such a box during flight, the velocity of the air must increase. However, any gain in kinetic energy the airflow may accrue due to its increased velocity must be negated by a drop in pressure. This drop in pressure (commonly known as the Venturi effect), in turn, may increase drag on an aircraft (the resulting drag is referred to herein as Venturi drag). Venturi drag can be substantially reduced or eliminated, though, by mounting a horizontal stabilizer 306 (see FIG. 3) substantially or entirely aft of fuselage 308.

The system and apparatus described herein provides significant advantages, some of which have already been mentioned. For example, a twin T-tail assembly can effectively extend the side structure of a cargo ramp directly into twin vertical stabilizers, creating a structurally efficient and potentially lighter weight tail configuration than found in current aft-loading aircraft.

Figure 4:
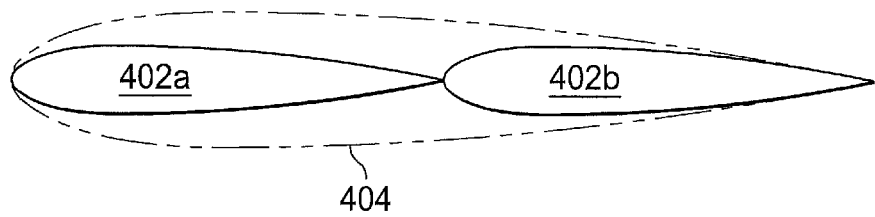
FIG. 4 is a simplified schematic diagram comparing total volume of a single vertical stabilizer and a twin vertical stabilizer.

More particularly, as FIG. 4 illustrates, twin vertical stabilizer sections 402a-402b with the same thickness-to-chord ratio as a single vertical stabilizer section 404 have much less total volume than single vertical stabilizer 404. FIG. 4 is a cross-section view of vertical stabilizer section 404, as may be found in a typical T-tail configuration, overlaid on twin vertical stabilizer sections 402a-402b that may be used in a twin T-tail configuration according to this specification. Vertical stabilizer total volume is a strong parametric weight indicator; thus, twin vertical stabilizer 604a-604b should be lighter than single vertical stabilizer 602, simply on a volume basis. Moreover, twin vertical stabilizer 402a-402b can be thinner and provide equivalent stabilizer area as single vertical stabilizer 404 while reducing the overall height of the tail assembly, which can facilitate storage and servicing.

Figure 5A:
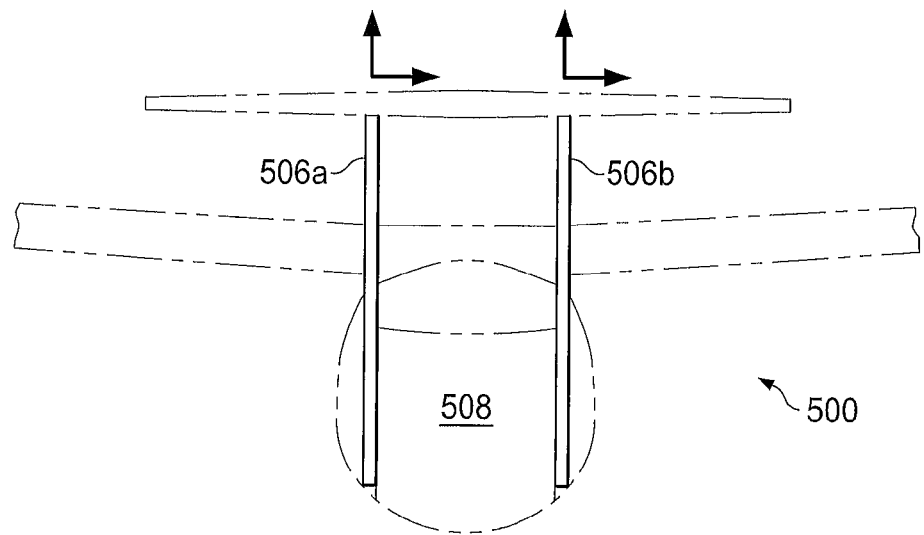
FIGS. 5A and 5B are simplified schematic diagrams comparing load paths of a twin T-tail assembly to a single T-tail assembly.
Figure 5B:
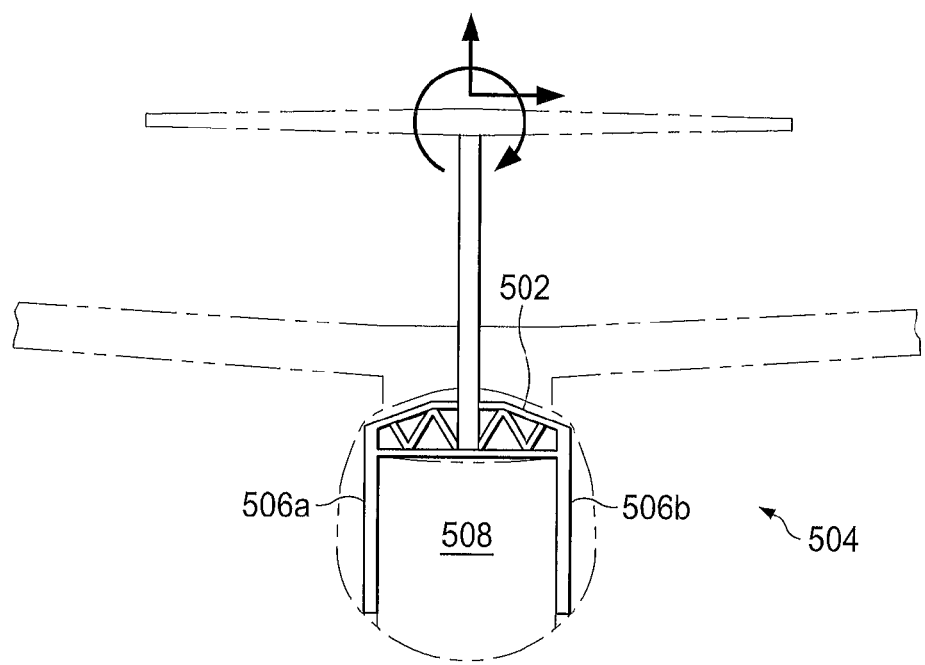

Additional advantages are illustrated in FIG. 5 by comparing load paths of a twin T-tail configuration (as described in this specification) to a single T-tail configuration. As illustrated in FIG. 5, a twin T-tail assembly 500 does not require structural beams 502 that may be required in a single T-tail assembly 504 to carry stabilizer loads out to the primary structure 506a-506b at the sides of aft opening 508, which can significantly reduce the weight and complexity of a tail assembly. Single point load path for horizontal-to-vertical moments and shear loads can also be reduced in twin T-tail assembly 500.

Figure 6A:
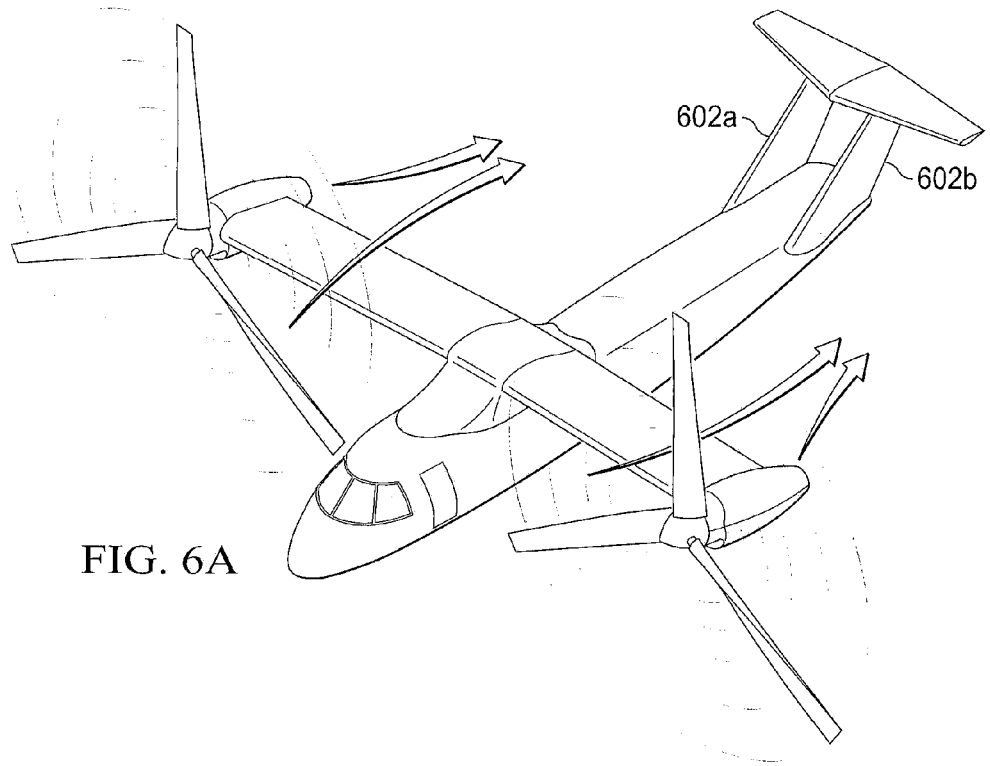
FIGS. 6A and 6B are simplified diagrams illustrating vibration advantages of a twin T-tail assembly to an H-tail assembly.
Figure 6B:
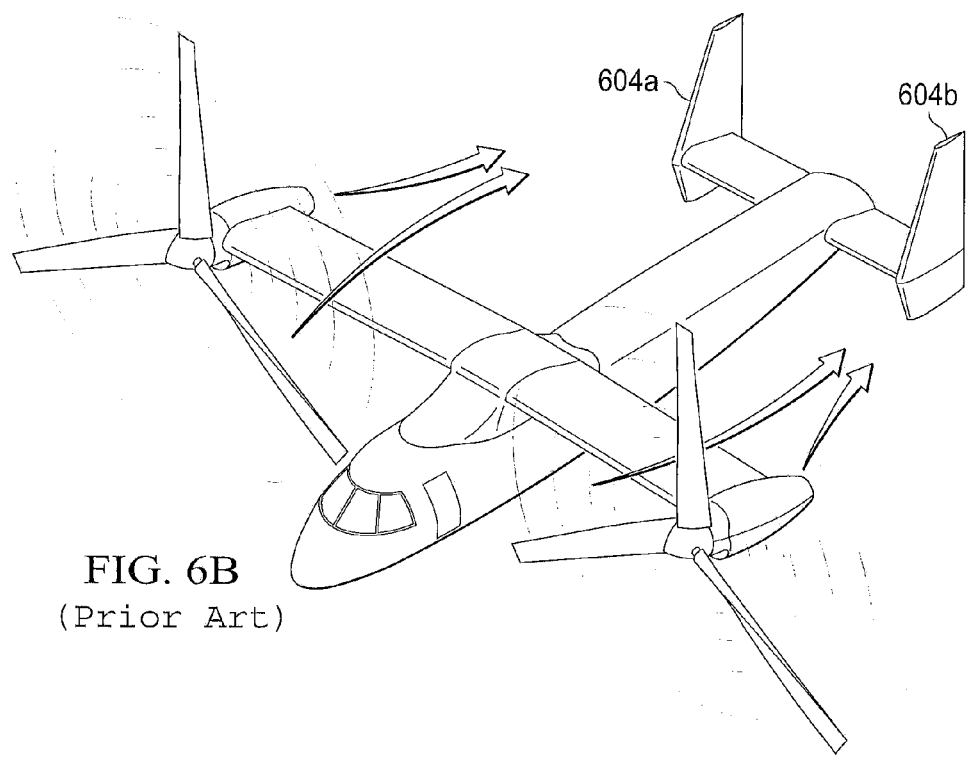

Additionally, as illustrated in FIG. 6, twin vertical stabilizers such as stabilizers 602a-602b can be placed closer together than vertical stabilizers 604a-604b in a comparable H-tail configuration, which can substantially reduce or eliminate vibrations from rotor wake and vortices impinging on vertical stabilizers 604a-604b in the H-tail.

Certain example embodiments have been shown in the drawings and described above, but variations in these embodiments will be apparent to those skilled in the art. The principles disclosed herein are readily applicable to a variety of aircraft, including tilt rotor and fixed wing aircraft with an aft-loading cargo ramp. The preceding description is for illustration purposes only, and the claims below should not be construed as limited to the specific embodiments shown and described.

The invention claimed is:

1. An aircraft tail assembly, comprising:
a fuselage portion having an aft opening with a cargo door;
a first and a second vertical stabilizer attached to the fuselage portion; and
a horizontal stabilizer transversely attached to the first and second vertical stabilizers;
wherein the fuselage portion further comprises a first side member adjacent to a first side of the aft opening and a second side member adjacent to a second side of the aft opening; and
wherein the first side member extends into the first vertical stabilizer and the second side member extends into the second vertical stabilizer, and
wherein the first side member and the second side member further extend, in a direction away from the first vertical stabilizer and the second vertical stabilizer, substantially a vertical depth of the fuselage portion along the aft opening to terminate substantially at the bottom of the fuselage portion.

2. The aircraft tail assembly of claim 1, wherein:
the first and second side members are each attached to an interior frame member of the fuselage portion.

3. The aircraft tail assembly of claim 1, wherein the horizontal stabilizer is located substantially aft of the fuselage portion.

4. An aircraft, comprising:
a fuselage;
wings attached to the fuselage;
a door in an aft portion of the fuselage for providing access to an interior portion of the fuselage;
a first and second vertical stabilizer attached to the aft portion of the fuselage; and a horizontal stabilizer transversely attached to the first and second vertical stabilizers;

wherein the fuselage further comprises a first side member adjacent to a first side of the door and a second side member adjacent to a second side of the door; and the first side member extends into the first vertical stabilizer and the second side member extends into the second vertical stabilizer, and wherein the first side member and the second side member also extend, in a direction away from the first vertical stabilizer and the second vertical stabilizer, substantially a vertical depth of the fuselage along the door to terminate substantially at the bottom of the fuselage;

wherein the first and second side members are each attached to an interior frame member of the fuselage.

5. The aircraft of claim 4, wherein the horizontal stabilizer is located substantially aft of the fuselage.

6. The aircraft of claim 4, further comprising a propulsion system attached to the wings.

7. The aircraft of claim 4, further comprising a tilt-rotor propulsion system attached to the wings.

8. The aircraft of claim 4, wherein the first and second vertical stabilizers extend upward and rearward from the aft portion of the fuselage such that a leading edge of the horizontal stabilizer is located aft of the fuselage.

* * * * *